United States Patent
Haydin et al.

(10) Patent No.: US 7,641,271 B1
(45) Date of Patent: Jan. 5, 2010

(54) VEHICLE BODY PASS-THROUGH STRUCTURE

(75) Inventors: Vedat Haydin, Westland, MI (US); Rick Miller, Rochester Hills, MI (US); Jim Beach, Canton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/168,043

(22) Filed: Jul. 3, 2008

(51) Int. Cl.
*B60J 10/00* (2006.01)

(52) U.S. Cl. .................. 296/208; 296/1.07; 16/2.1

(58) Field of Classification Search ............... 296/208, 296/1.07, 1.06, 1.08, 97.9; 277/607, 609, 277/616, 626, 624; 16/2.1; 174/663, 650
See application file for complete search history.

(56) References Cited

U.S. PATENT DOCUMENTS

| | | | | |
|---|---|---|---|---|
| 4,839,937 A | * | 6/1989 | Oikawa et al. | 174/153 G |
| 4,912,287 A | * | 3/1990 | Ono et al. | 174/153 G |
| 4,928,349 A | * | 5/1990 | Oikawa et al. | 174/153 G |
| 4,945,193 A | * | 7/1990 | Oikawa et al. | 174/153 G |
| 5,056,801 A | * | 10/1991 | Beadle | 277/577 |
| 5,201,564 A | * | 4/1993 | Price | 296/97.9 |
| 5,562,292 A | * | 10/1996 | Roy et al. | 277/634 |
| 5,967,567 A | * | 10/1999 | Nordstrom | 285/139.1 |
| 6,114,954 A | | 9/2000 | Palett et al. | |
| 6,677,524 B2 | * | 1/2004 | Fukumoto et al. | 174/660 |
| 7,081,810 B2 | | 7/2006 | Henderson et al. | |
| 7,226,107 B1 | * | 6/2007 | Wheeler et al. | 296/97.9 |
| 7,244,894 B1 | | 7/2007 | Lipp | |
| 7,273,986 B2 | | 9/2007 | Fuller et al. | |
| 2002/0014789 A1 | | 2/2002 | Sora et al. | |
| 2002/0138942 A1 | * | 10/2002 | Sato et al. | 16/2.1 |
| 2004/0206538 A1 | | 10/2004 | Okuhara | |
| 2008/0122236 A1 | | 5/2008 | Peterson | |

* cited by examiner

*Primary Examiner*—Patricia L Engle
(74) *Attorney, Agent, or Firm*—Global IP Counselors, LLP (57) ABSTRACT

A vehicle body pass-through structure is basically provided with a seal member, a rigid mounting member and a grommet. The seal member includes a first side, a second side and an access opening extending through the seal member between the first side and the second side. The rigid mounting member overlies the second side of the seal member so that the access opening of the seal member aligns with an attachment aperture of the mounting member. The grommet includes a first open end portion, a second open end portion, and a passageway extending between the first open end portion and the second open end portion. The first open end portion is disposed in the attachment aperture of the mounting member.

21 Claims, 10 Drawing Sheets

VEHICLE BODY PASS-THROUGH STRUCTURE

BACKGROUND OF THE INVENTION

1. Field of the Invention

The present invention generally relates to a vehicle body pass-through structure. More specifically, the present invention relates to a vehicle body pass-through structure for passing an electrical wire through a body panel of a vehicle.

2. Background Information

Some vehicles such as trucks and sport utility vehicles often have exterior electrical devices mounted to the roof. For example, fog lights and off road utility lights are common accessories that are added onto light trucks and sport utility vehicles (e.g., see U.S. Patent Publication No. 2008/0122236. Typically, off road lights are mounted to the front or roof of a vehicle. When electrical devices such as off road lights are mounted to the roof, it is necessary to provide an opening in the roof for an electrical wiring harness to pass through the roof in order to connect the roof mounted electrical devices to the interior electrical system. When such an opening is formed in the vehicle roof, it is necessary to provide a watertight seal between the electrical wiring harness and the opening in the vehicle roof to avoid water from entering the interior cabin of the vehicle.

In view of the above, it will be apparent to those skilled in the art from this disclosure that there exists a need for an improved vehicle body pass-through structure that provides a watertight seal between the electrical wiring harness and the opening in the vehicle roof to avoid water from entering the interior cabin of the vehicle. This invention addresses this need in the art as well as other needs, which will become apparent to those skilled in the art from this disclosure.

SUMMARY OF THE INVENTION

One object is to provide a vehicle body pass-through structure that provides a watertight seal between an electrical wiring harness and an opening in the vehicle roof to avoid water from entering the interior cabin of the vehicle.

To achieve this object, a vehicle body pass-through structure is provided that basically comprises a seal member, a rigid mounting member and a grommet. The seal member includes a first side, a second side and an access opening extending through the seal member between the first side and the second side. The rigid mounting member overlies the second side of the seal member so that the access opening of the seal member aligns with an attachment aperture of the mounting member. The grommet includes a first open end portion, a second open end portion, and a passageway extending between the first open end portion and the second open end portion. The first open end portion is disposed in the attachment aperture of the mounting member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
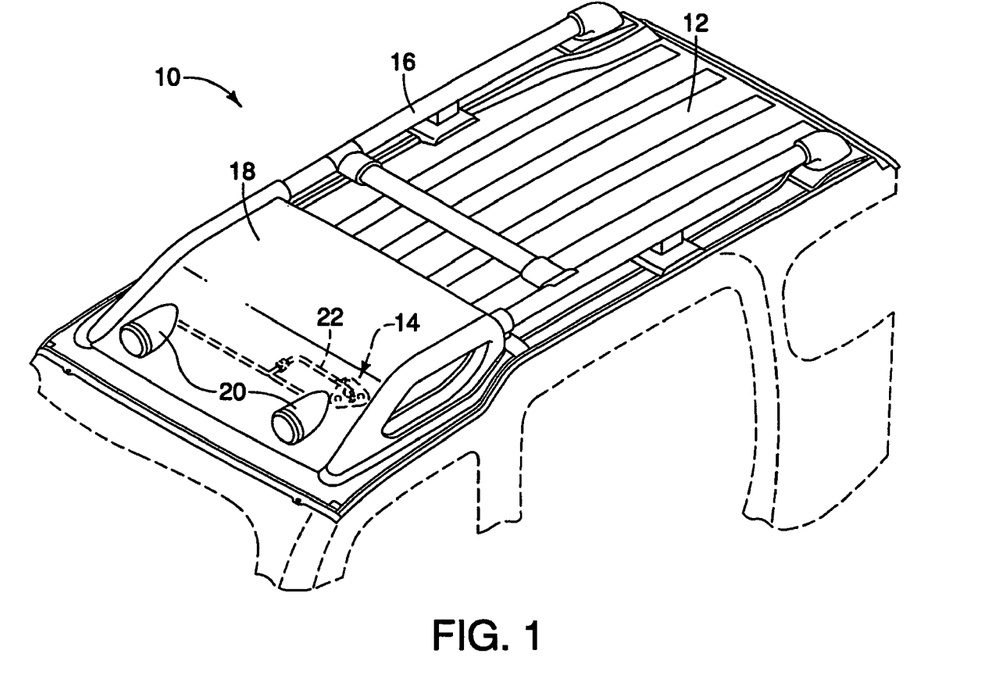
FIG. 1 is a perspective view of a vehicle roof with a roof rack including an air deflector and a pair of lamps mounted within the air deflector portion of the load carrier rack in which a vehicle body pass-through structure is used to seal a wiring harness of the lamps that pass through an opening in the vehicle roof in accordance with a first embodiment.
Figure 2:
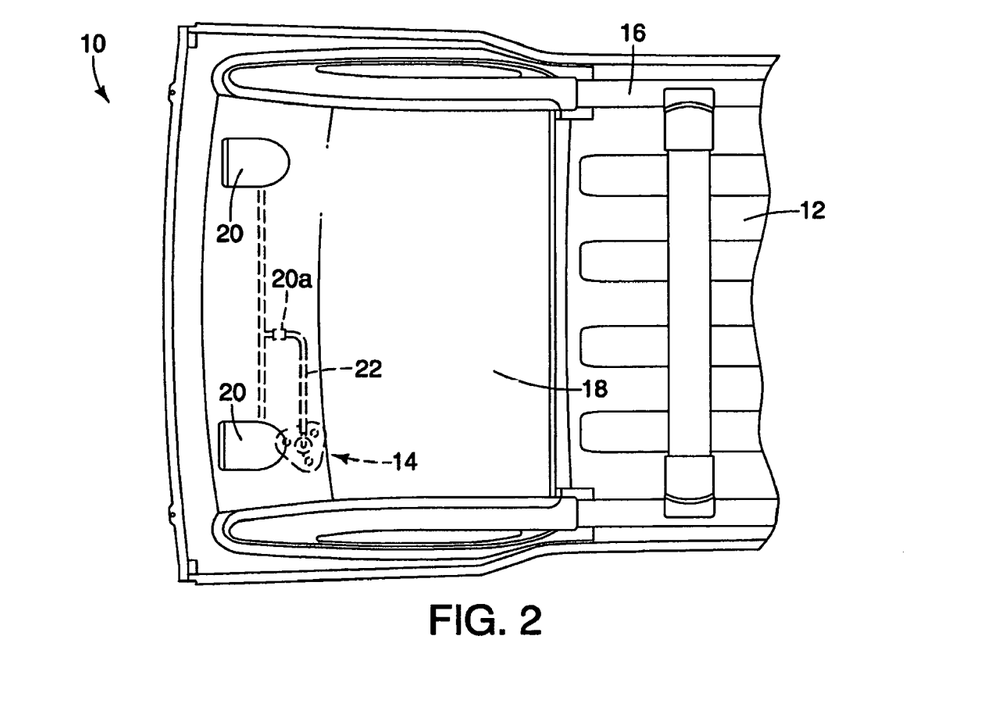
FIG. 2 is a top plan view of the vehicle roof with the vehicle body pass-through structure illustrated in FIG. 1.
Figure 3:
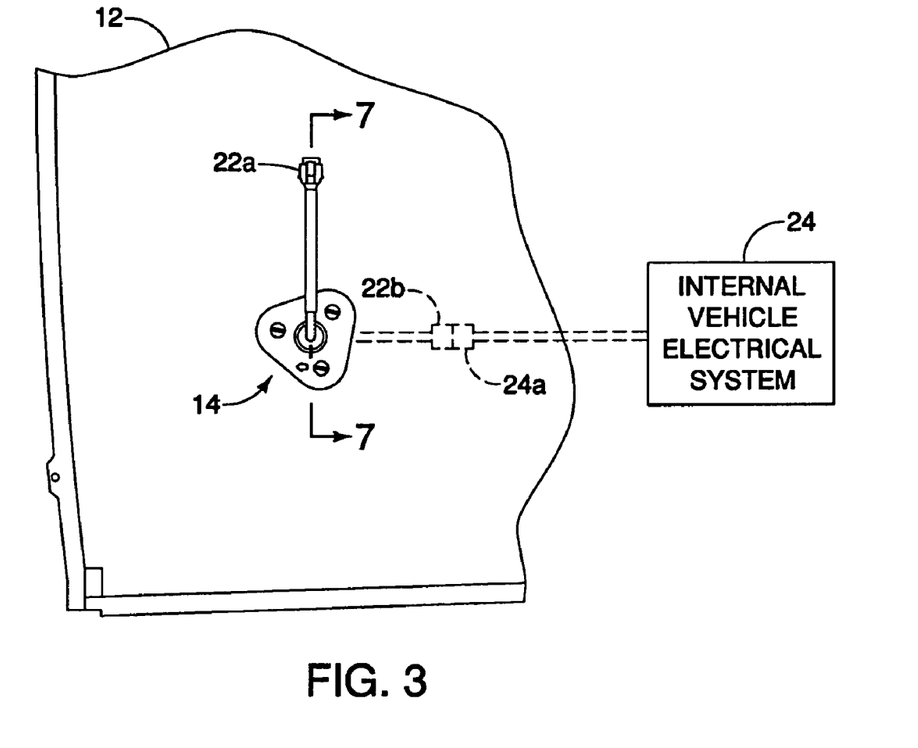
FIG. 3 is an enlarged top plan view of the vehicle roof with the vehicle body pass-through structure illustrated in FIGS. 1 and 2, with the air deflector and the lamps removed.
Figure 4:
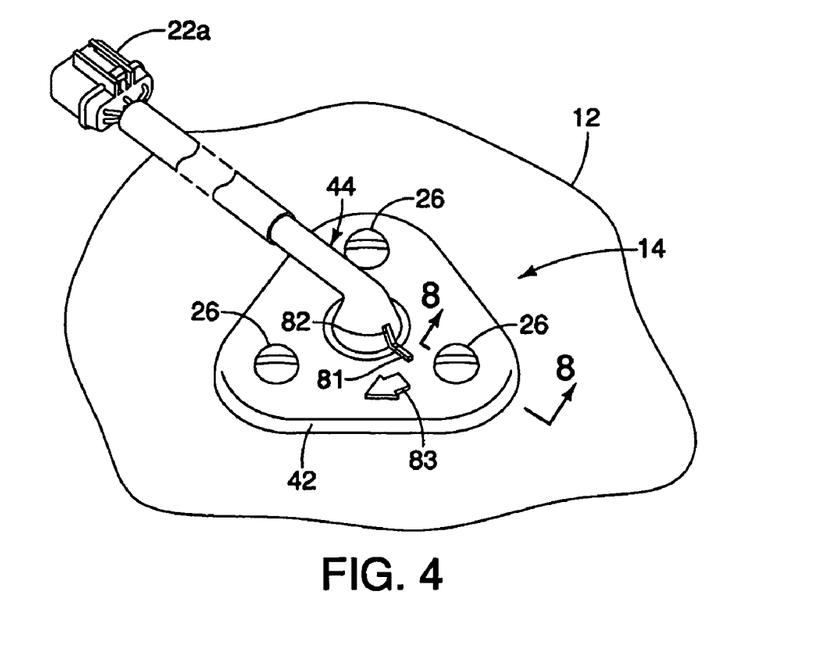
FIG. 4 is an enlarged, top perspective view of the vehicle body pass-through structure mounted to the vehicle roof panel.
Figure 5:
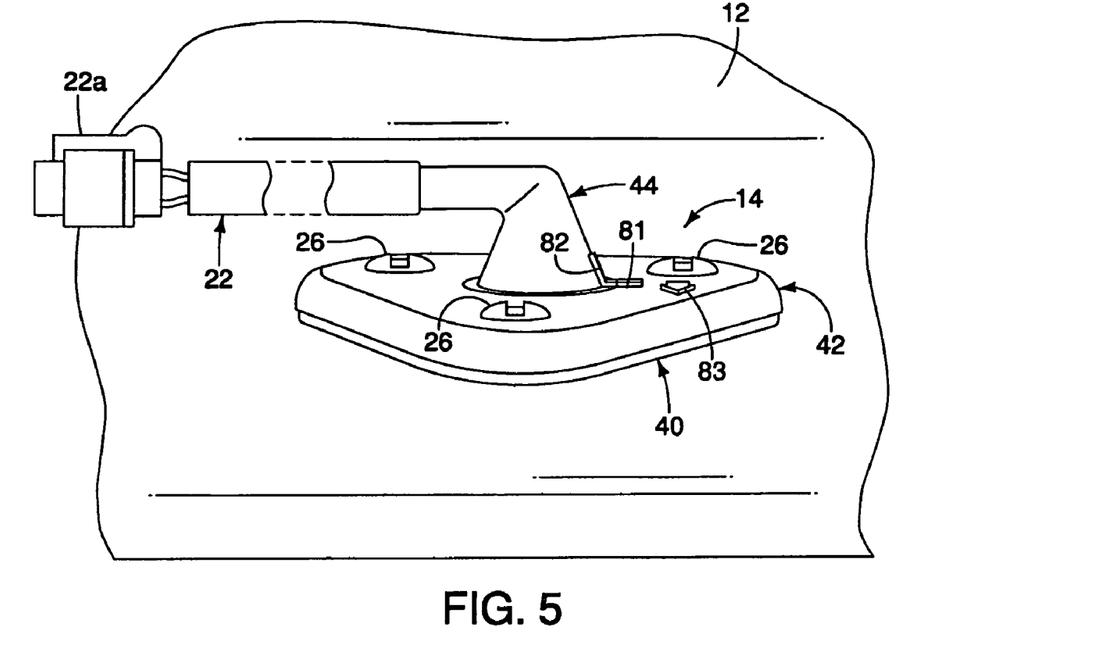
FIG. 5 is a front side elevational view of the vehicle body pass-through structure mounted to the vehicle roof panel.

Referring initially to FIGS. 1 to 3, a vehicle 10 is partially illustrated that includes a vehicle roof panel 12 having a vehicle body pass-through structure 14 in accordance with a first embodiment. The vehicle roof panel 12 also has a roof rack 16 with an air deflector 18 mounted to a front end of the roof rack 16. The air deflector 18 has a pair of off road lamps 20 mounted within the air deflector 18. The lamps 20 are electrically connected to a wiring harness 22 that pass through the vehicle roof panel 12. The lamps 20 are electrically coupled to an interior vehicle electrical system 24 of the vehicle 10 by the wiring harness 22.

In the illustrated embodiment, the vehicle body pass-through structure 14 provides a watertight seal for the wiring harness 22 to pass through the vehicle roof panel 12 so that water will not enter the vehicle therethrough. The wiring harness 22 is a conventional wiring harness having a plurality of electrical wires with a first electrical connector 22a at one end and a second electrical connector 22b at the other end. The first electrical connector 22a is electrically coupled to a mating electrical connector 20a of wiring of the lamps 20. The second electrical connector 22b is electrically coupled to a mating electrical connector 24a of the interior vehicle electrical system 24. Basically, the vehicle roof panel 12 constitutes an exterior vehicle body panel of the vehicle 10 in which the lamps 20 constitutes one example of an exterior vehicle accessory disposed on an exterior side of the vehicle roof panel 12 (e.g., the exterior vehicle body panel). The interior vehicle electrical system 24 one example of constitutes an interior vehicle part of the vehicle 10, which is disposed on an interior side of the vehicle roof panel 12 (e.g., the exterior vehicle body panel), with interior vehicle electrical system 24 (e.g., the interior vehicle part) being electrically coupled to the lamps 20 (e.g., the exterior vehicle accessory) via the electrical wires of the wiring harness 22. Of course, it will be apparent to those skilled in the art from this disclosure that the vehicle body pass-through structure 14 be used with other types of exterior vehicle accessories, as need and/or desired.

Figure 6:
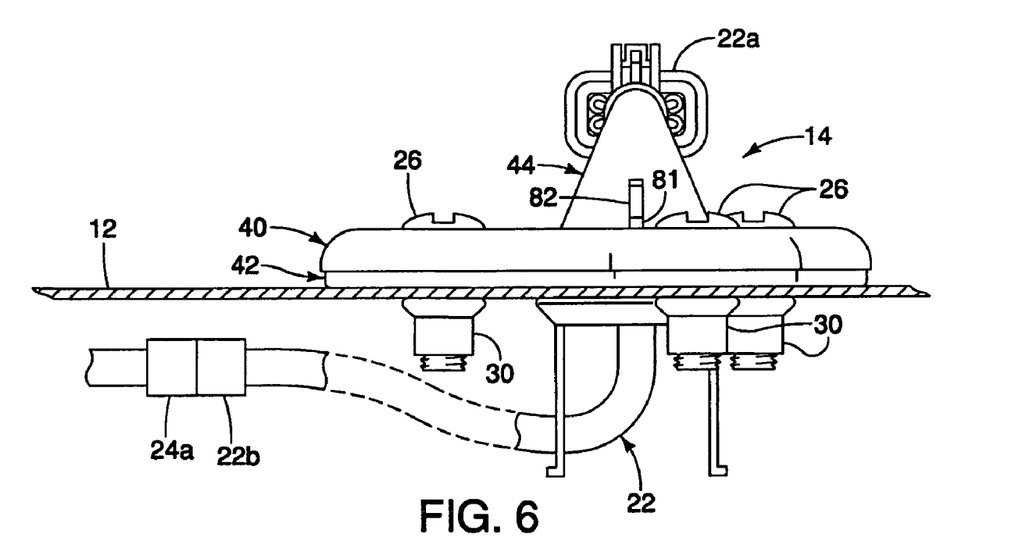
FIG. 6 is a cross sectional view of the vehicle roof panel as seen along section line 6-6 of FIG. 3 to show the vehicle body pass-through structure mounted to the vehicle roof panel.
Figure 7:
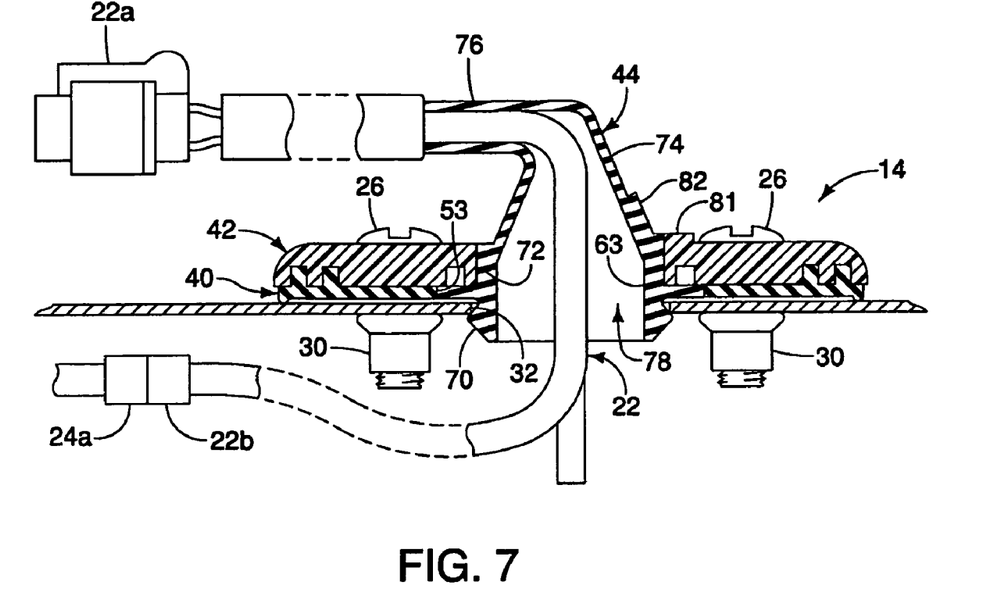
FIG. 7 is a cross sectional view of the vehicle body pass-through structure as seen along section line 7-7 of FIG. 3 to show the wiring harness extending through vehicle body pass-through structure that is mounted to the vehicle roof panel.
Figure 8:
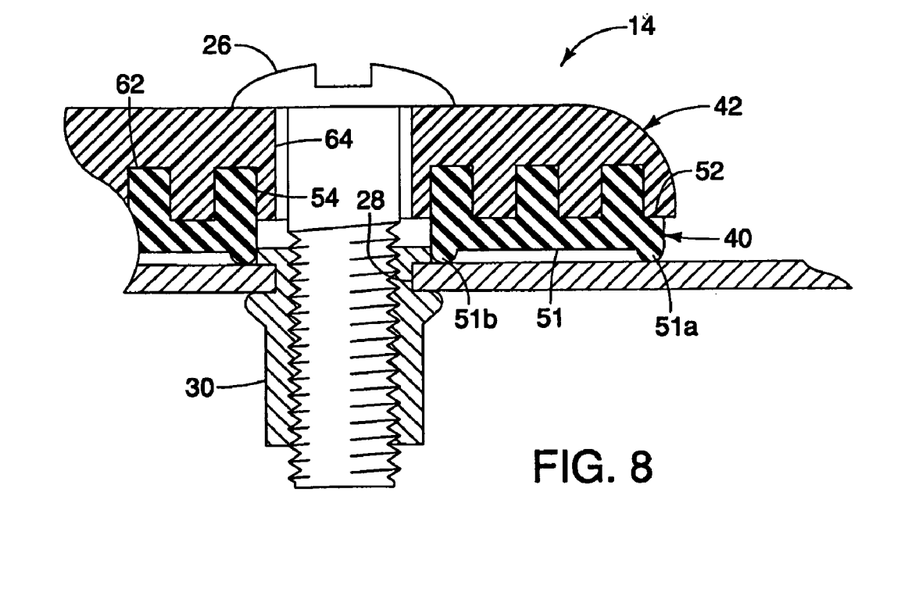
FIG. 8 is an enlarged, cross sectional view of the vehicle body pass-through structure as seen along section line 8-8 of FIG. 4 to show the interface between the vehicle body pass-through structure and the vehicle roof panel at one of the mounting points.
Figure 9:
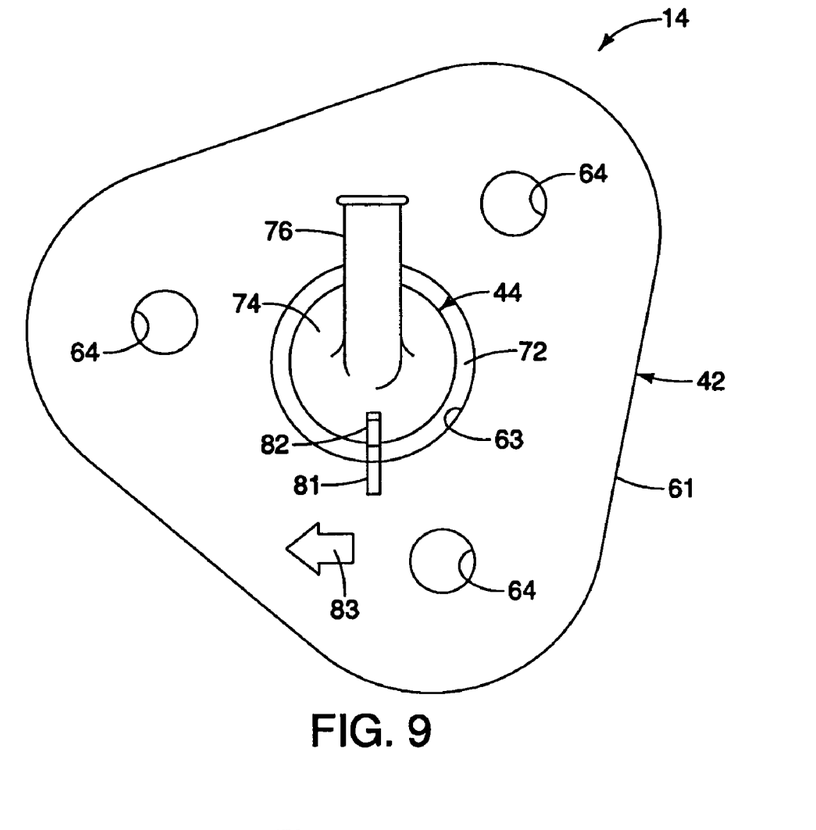
FIG. 9 is a top plan view of the vehicle body pass-through structure illustrated in FIGS. 1 to 8, but removed from the vehicle roof panel.
Figure 10:
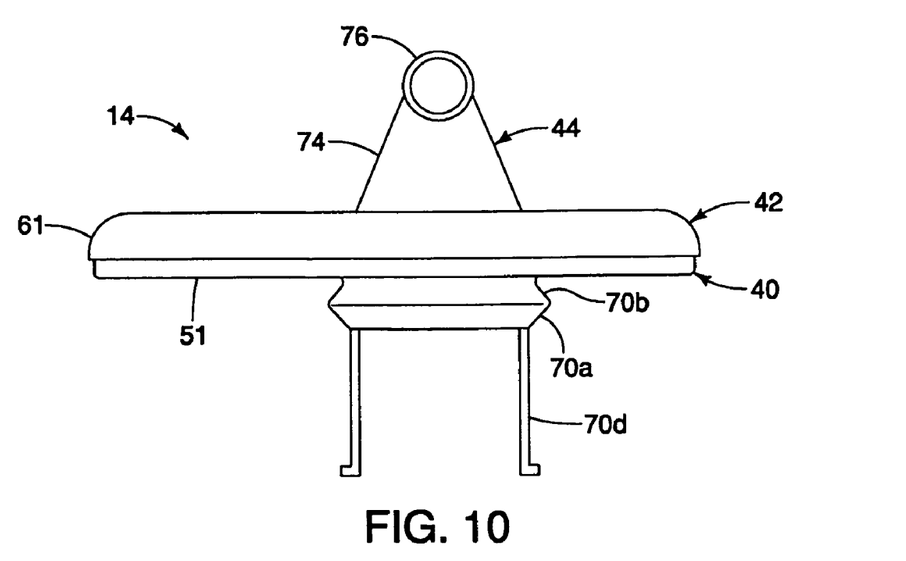
FIG. 10 is a side elevational view of the vehicle body pass-through structure illustrated in FIG. 9.
Figure 11:
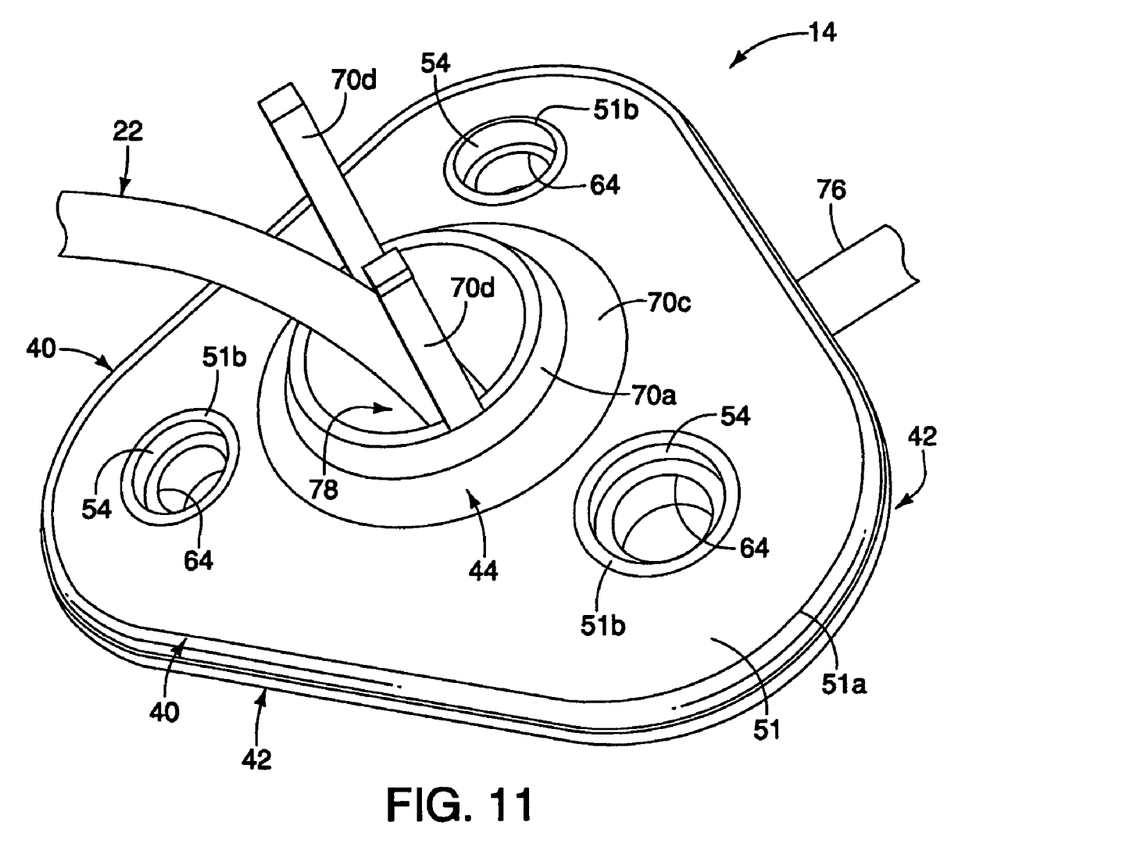
FIG. 11 is a bottom perspective view of the vehicle body pass-through structure illustrated in FIGS. 9 and 10.

Referring now to FIGS. 6 to 8, the vehicle body pass-through structure 14 is fastened to the vehicle roof panel 12 by a plurality of bolts or fasteners 26 that pass through a plurality of bolt holes 28 (FIG. 8) in the vehicle roof panel 12 and then thread into a plurality of nuts 30 that are preferably mechanically secured to the interior side surface of the vehicle roof panel 12. The bolts 26 are preferably shoulder bolts that have a sealant disposed on the contact surface of the heads of the bolts 26. The sealant of the bolts 26 prevents the ingress of water from seeping in from between the bolt heads and the vehicle body pass-through structure 14. The nuts 30 are preferably rivet nuts with sealant disposed on the contact surfaces of the nuts 30.

As seen in FIG. 7, the vehicle roof panel 12 has a circular exterior body panel opening 32, which receives a part of the vehicle body pass-through structure 14 therein as discussed below. The vehicle body pass-through structure 14 is used to seal the exterior body panel opening 32 in the vehicle roof panel 12. Thus, the vehicle body pass-through structure 14 provides a watertight passage for the wiring harness 22 to pass through the exterior body panel opening 32 in the vehicle roof panel 12.

Referring now to FIGS. 12 to 15, the vehicle body pass-through structure 14 basically includes a seal member 40, a rigid mounting member 42 and a grommet 44. The seal member 40 and the rigid mounting member 42 are formed in a mold-over process. Thus, the seal member 40 and the rigid mounting member 42 are molded together to form a base member that is fixedly secured to the exterior surface of the vehicle roof panel 12 by the bolts 26. When the vehicle body pass-through structure 14 is mounted to the vehicle roof panel 12, the grommet 44 is sandwiched between the exterior surface of the vehicle roof panel 12 and the seal member 40 such that the seal member 40 seals the exterior body panel opening 32 and the bolt holes 28 as explained below.

Figure 12:
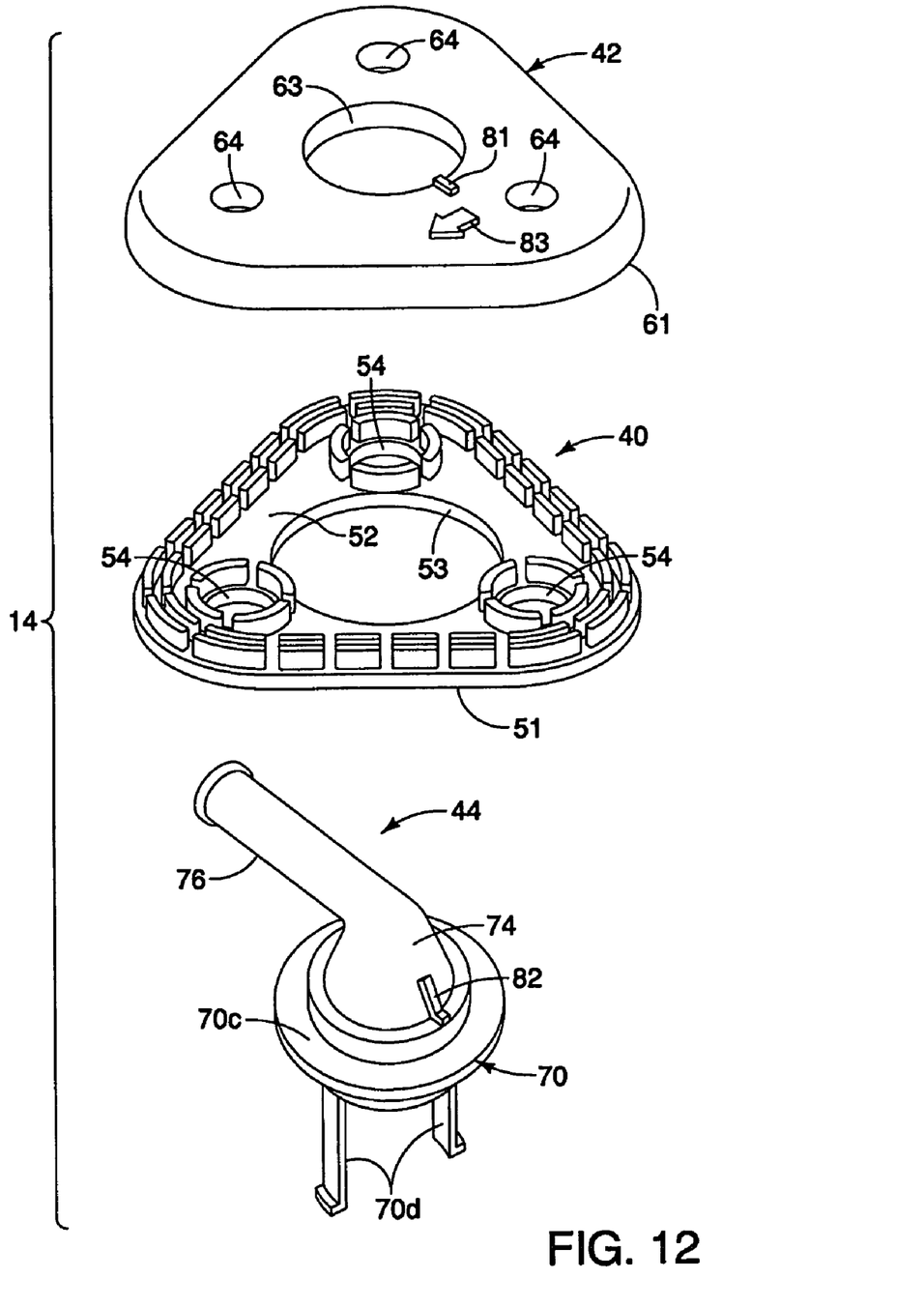
FIG. 12 is an exploded perspective view of the vehicle body pass-through structure illustrated in FIGS. 9 to 11.
Figure 13:
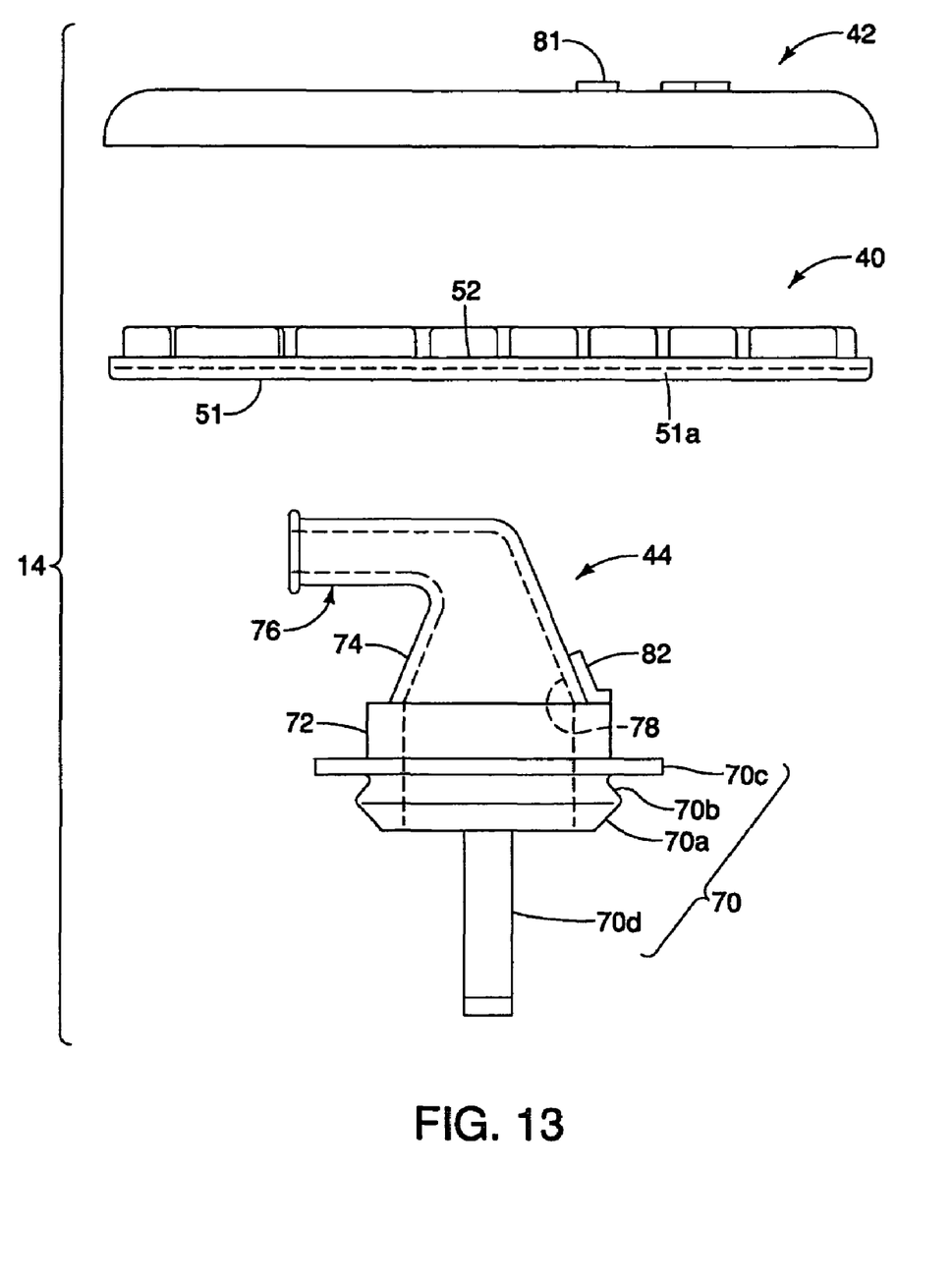
FIG. 13 is an exploded elevational view of the vehicle body pass-through structure illustrated in FIGS. 9 to 12.
Figure 14:
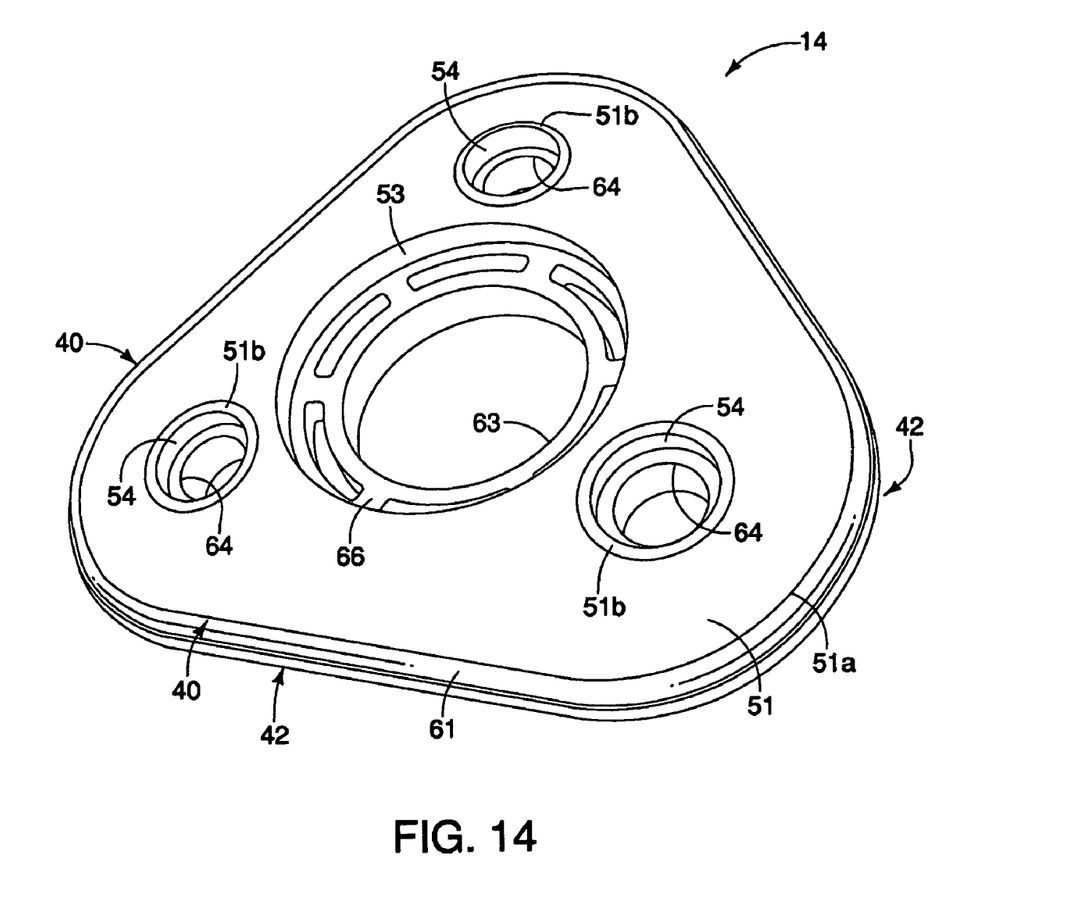
FIG. 14 is a bottom perspective view of the seal member and the rigid mounting member of the vehicle body pass-through structure with the grommet removed.
Figure 15:
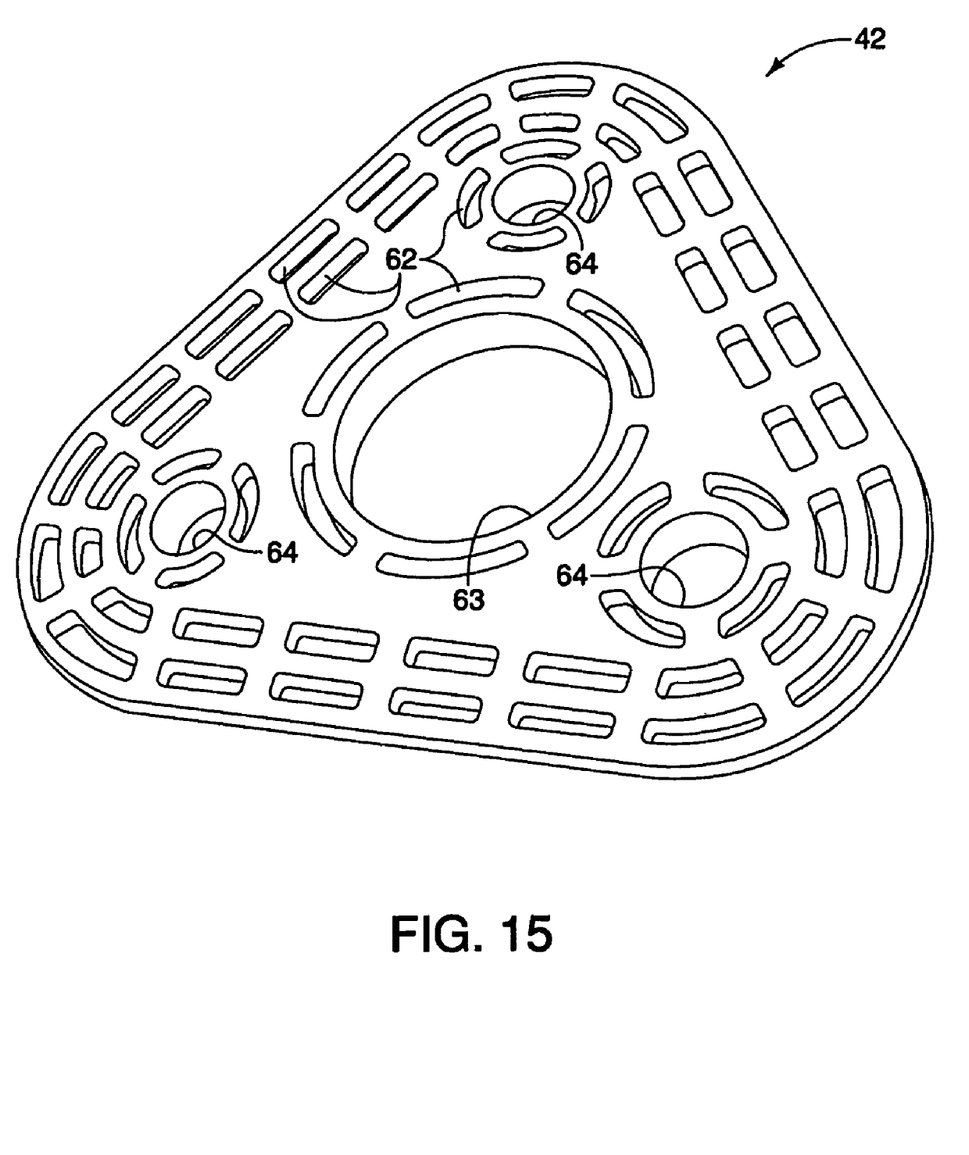
FIG. 15 is a bottom perspective view of the seal member and the rigid mounting member of the vehicle body pass-through structure with the grommet removed.

As best seen in FIGS. 12 and 13, the seal member 40 is a one-piece, unitary member that is formed of an elastically deformable material such as a compressible rubber, e.g., EPDM rubber (ethylene propylene diene monomer rubber). The seal member 40 has a generally triangular shape, and includes a first side 51, a second side 52 and a center access opening 53 extending through the seal member 40 between the first side 51 and the second side 52. The center access opening 53 is dimensioned to receive a portion of the grommet 44 therein. The seal member 40 further includes a plurality of fastener mounting holes 54 extending through the seal member 40 between the first side 51 and the second side 52. The fastener mounting holes 54 are dimensioned to receive the bolts or fasteners 26 therethrough. In the illustrated embodiment, the seal member 40 has three of the fastener mounting holes 54, which are spaced 120° apart about the center axis of the center access opening 53.

The seal member 40 further includes a first annular sealing bead 51a that projects outwardly from the first side 51 of the seal member 40 and a plurality of second annular sealing beads 51b that projects outwardly from the first side 51 of the seal member 40. The first annular sealing bead 51a is disposed around (i.e., encircles) the access opening 53 and the fastener mounting holes 54, while the second annular sealing beads 51b are arranged such that one of the second annular sealing beads 51b is disposed around (i.e., encircles) each of the fastener mounting holes 54. When the vehicle body pass-through structure 14 is mounted to the vehicle roof panel 12, the tightening of the bolts 26 will cause the mounting member 42 to squeeze the seal member 40 against the vehicle roof panel 12 such that will the sealing beads 51a and 51b are compress against the vehicle roof panel 12. Thus, the sealing bead 51a creates a watertight seal at the peripheral edge of the vehicle body pass-through structure 14, while the sealing bead 51b creates an additional watertight seal around each of the bolts 26.

The mounting member 42 is a rigid member that overlies the second side 52 of the seal member 40. For example, the mounting member 42 is a one-piece, unitary member that is formed of a non-metallic material such as nylon that is reinforced with thirty-three percent or more of glass fiber. In the illustrated embodiment, the mounting member 42 is about eight millimeters thick. The mounting member 42 has a lower surface 61 in which the seal member 40 is secured. When the vehicle body pass-through structure 14 is mounted to the vehicle roof panel 12, the lower surface 61 does not contact the vehicle roof panel 12.

Preferably, the mounting member 42 is molded with a plurality of seal receiving recesses 62 such that when the seal member 40 is molded over the mounting member 42, portions of the rubber material are disposed in the seal receiving recesses 62. In other words, when the seal member 40 is molded over the mounting member 42, the second surface of the seal member 40 is formed with projections that are disposed in seal receiving recesses 62. In the illustrated embodiment, the mounting member 42 has an overall maximum thickness of about eight millimeters with the seal receiving recesses 62 being about four and one half millimeters deep. The seal member 40 projects outwardly from the bottom surface of the mounting member 42 by a prescribed amount of about four millimeters. Thus, upon tightening of the bolts 26 to fasten the vehicle body pass-through structure 14 to the vehicle roof panel 12, the heads of the bolts 26 apply a downward pressure on the mounting member 42 to press the seal member 40 against the vehicle roof panel 12.

The mounting member 42 has an attachment aperture 63 and three fastener mounting bores 64. The attachment aperture 63 corresponds to the center access opening 53 of the seal member 40, while the fastener mounting bores 64 corresponds to the fastener mounting holes 54 of the seal member 40. In other words, when the seal member 40 is molded on the mounting member 42, the centers of the opening 53 and the aperture 63 are aligned, while the centers of the holes 54 and the bores 64 are aligned, respectively.

When the seal member 40 is mold onto the lower surface 61 of the mounting member 42, the access opening 53 of the seal member 40 is formed with a larger diameter than the attachment aperture 63 of the mounting member 42. Thus, the mounting member 42 is formed with an end face 66 on its lower surface 61. The end face 66 of the mounting member 42 is recessed from the first side 51 of the seal member 40 such that a portion of the grommet 44 is received therein as discussed below.

As best seen in FIGS. 7, 12 and 13, the grommet 44 is a one-piece, unitary member that is formed of an elastically deformable material such as a compressible rubber, e.g., EPDM rubber (ethylene propylene diene monomer rubber). The grommet 44 basically includes a tubular roof attachment part 70, a center tubular part 72, a funnel-shaped part 74 and a tubular conduit attachment part 76. The tubular roof attachment part 70, the center tubular part 72, the funnel-shaped part 74 constitutes a first open end portion of the grommet 44, while the tubular conduit attachment part 76 constitutes a second open end portion of the grommet 44. A continuous passageway 78 is formed in the parts 70, 72, 74 and 76 for receiving the wiring harness 22 therethrough. Thus, the passageway 78 extends between the first and second open end portions of the grommet 44. The passageway 78 of the grommet 44 is a generally L-shaped along the first and second open end portions of the grommet 44, which results in the first and second open end portions of the grommet 44 being not axially aligned.

The tubular roof attachment part 70 basically includes an inclined insertion surface 70a, an inclined panel retaining surface 70b, a contact member 70c and a pair of installation elements or straps 70d. The tubular roof attachment part 70 (i.e., the first open end portion) of the grommet 44 is dimensioned for gripping the circular exterior body panel opening 32 in the vehicle roof panel 12, while the mounting member 42 is dimensioned for retaining the grommet 44 on the vehicle roof panel 12. Moreover, the inclined panel retaining surface 70b and the contact member 70c are dimensioned relative to each other to define an annular body panel receiving groove, which receives the vehicle roof panel 12, when the vehicle body pass-through structure 14 is installed onto the vehicle roof panel 12 (i.e., when the grommet 44 is installed into the circular exterior body panel opening 32).

The inclined insertion surface 70a forms tapered edge surface that is inclined radially outwardly as the tapered edge surface approaches towards the inclined panel retaining surface 70b and the annular body panel receiving groove. The inclined insertion surface 70a is dimensioned relative to the circular exterior body panel opening 32 of the vehicle roof panel 12 to aid in the insert of the grommet 44 into the circular exterior body panel opening 32 of the vehicle roof panel 12.

As mentioned above, the inclined panel retaining surface 70b and the contact member 70c define an annular body panel receiving groove for receiving the vehicle roof panel 12. Thus, the lower face of the contact member 70c of the grommet 44 contacts the exterior surface of the vehicle roof panel 12. The upper face of the contact member 70c of the grommet 44 engages the end face 66 of the mounting member 42 to restrict axial movement of the grommet 44 in the attachment aperture 63 of the mounting member 42 in an axial direction from the first side 51 of the mounting member 42 to the second side 52 of the mounting member 42. In other words, the contact member 70c of the grommet 44 has its lower (first) face disposed adjacent the first side 51 of the seal member 40 and its upper (second) face engaging the end face 66 of the mounting member 42. Preferably, the first side 51 of the seal member 40 and the lower (first) face of the contact member 70c of the grommet 44 are aligned with the annular body panel receiving groove being disposed adjacent the lower (first) face of the contact member 70c of the grommet 44.

The installation elements or straps 70d of the grommet 44 are provided to aid in the installation of the grommet 44 into the circular exterior body panel opening 32 in the vehicle roof panel 12. The installation straps 70d extend from the free end of the tubular roof attachment part 70 such that the installer can pull the grommet 44 through the circular exterior body panel opening 32 in the vehicle roof panel 12.

As best seen in FIG. 7, the passageway 78 of the grommet 44 is basically L-shaped. The inner surface of the passageway 78 basically includes a lower cylindrical section along the tubular roof attachment part 70 and the center tubular part 72, a funnel-shaped section along the funnel-shaped part 74, an upper cylindrical section along the tubular conduit attachment part 76. The funnel-shaped section of the passageway 78 has a wide diameter part located adjacent the lower cylindrical section of the grommet 44 and a smaller diameter part located towards the upper cylindrical section of the grommet 44 such that the funnel-shaped section narrows as the funnel-shaped section approaches the upper cylindrical section of the grommet 44. The upper cylindrical section of the passageway 78 of the grommet 44 is perpendicularly arranged with respect to a center axis of the funnel-shaped section of the passageway 78.

To install the vehicle body pass-through structure 14 onto the vehicle roof panel 12, the grommet 44 first inserted into the circular exterior body panel opening 32 in the vehicle roof panel 12. This is done by the installer first inserting the installation elements or straps 70d into the circular exterior body panel opening 32 in the vehicle roof panel 12 from the exterior side of the vehicle roof panel 12. Then, the installer pulls the installation elements or straps 70d from the interior side of the vehicle roof panel 12 such that the inclined insertion surface 70a first contacts the edge of the circular exterior body panel opening 32 in the vehicle roof panel 12. The engagement between the inclined insertion surface 70a and the circular exterior body panel opening 32 in the vehicle roof panel 12 causes the tubular roof attachment part 70 to be compressed inward in a radial direction so that the tubular roof attachment part 70 is received in the circular exterior body panel opening 32 in the vehicle roof panel 12. Once the inclined insertion surface 70a passes through the circular exterior body panel opening 32 in the vehicle roof panel 12, the tubular roof attachment part 70 expands outward in the radial direction such that the inclined panel retaining surface 70b contacts the interior side of the vehicle roof panel 12 and the contact member 70c contacts the exterior side of the vehicle roof panel 12. Thus, the inclined panel retaining surface 70b and the contact member 70c form an annular body panel receiving groove.

Next, the mounting member 42, with the seal member 40 disposed thereon, is installed over the grommet 44. In particular, the mounting member 42 and the seal member 40 are installed over the grommet 44 such that the center tubular part 72 of the grommet 44 is disposed in the attachment aperture 63 of the mounting member 42 and the contact member 70c is disposed in the center access opening 53 of the seal member 40. Preferably, the first side 51 of the seal member 40 is flush with the lower side of the contact member 70c. Thus, the contact member 70c of the grommet 44 is sandwiched between the exterior surface of the roof and the end face 66 of the lower surface 61 of the mounting member 42. Preferably, the contact member 70c of the grommet 44 is an annular flange with an axial thickness (e.g., four millimeters) that is equal to the thickness (e.g., four millimeters) of the seal member 40 that is disposed below the lower surface 61 of the mounting member 42.

Now, the bolts 26 are inserted though the bores 64 of the mounting member 42 and the holes 54 of the seal member 40 so as to threadedly engage the nuts 30. Upon tightening the bolts 26, the beads 51a and 51b of the seal member 40 and the contact member 70c of the grommet 44 are both compressed against exterior surface of the vehicle roof panel 12 to create a watertight seal.

Preferably, to aid in the proper installation of the vehicle body pass-through structure 14 to the vehicle roof panel 12, the mounting member 42 further includes first alignment indicia 81, while the grommet 44 includes second alignment indicia 82 that aligns with the first alignment indicia 81 to properly position the grommet 44 with respect to the mounting member 42. The mounting member 42 further preferably includes orientation indicia 83 in the form of an arrow to properly orient the mounting member 42 with respect to the vehicle roof panel 12 in which the vehicle body pass-through structure 14 is to be installed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body pass-through structure. Accordingly, these terms, as utilized to describe the vehicle body pass-through structure should be interpreted relative to a vehicle equipped with the vehicle body pass-through structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body pass-through structure comprising:
   an elastically deformable seal member including a first side, a second side, an access opening extending through the seal member between the first side and the second side, and a first annular sealing bead projecting outward from the first side along an outer peripheral edge of the first side;
   a rigid mounting member overlying the second side of the seal member so that the access opening of the seal member aligns with an attachment aperture of the mounting member, the rigid mounting member having an outer edge which radially extends beyond the outer peripheral edge of the first side of the seal member with respect to the attachment aperture; and
   a grommet including a first open end portion, a second open end portion, and a passageway extending between the first open end portion and the second open end portion, the first open end portion being disposed in the attachment aperture of the mounting member.

2. The vehicle body pass-through structure according to claim 1, further comprising:
   a plurality of fastener mounting holes extending through the seal member and the rigid mounting member, with the first annular sealing bead spaced radially outward from the fastener mounting holes with respect to the attachment aperture,
   and
   a plurality of second annular sealing beads that projects outwardly from the first side of the seal member, with one of the second annular sealing beads being disposed around each of the fastener mounting holes.

3. The vehicle body pass-through structure according to claim 2, wherein
   the mounting member further includes a lower surface with a plurality of recesses, the seal member being molded over the lower surface of the mounting member with portions of the seal member extending into the recesses of the lower surface of the mounting member,
   the recesses including a first plurality of recesses disposed along an outer periphery of the mounting member between the outer edge of the mounting member and the fastener mounting holes, and a second plurality of recesses disposed radially inward of the first plurality of recesses with respect the attachment aperture and about a circumference of the fastener mounting holes.

4. The vehicle body pass-through structure according to claim 1, wherein
   the attachment aperture of the mounting member has a smaller diameter than the access opening of the seal member such that the mounting member has an end face that is recessed from the first side of the seal member thereby defining a recess; and
   the grommet further includes a contact member disposed in the recess.

5. The vehicle body pass-through structure according to claim 4, wherein
   the contact member is an annular flange with a lower face disposed adjacent the first surface of the seal member.

6. The vehicle body pass-through structure according to claim 1, wherein
   the mounting member further includes a lower surface with a plurality of recesses, the seal member being molded over the lower surface of the mounting member with portions of the seal member extending into the recesses of the lower surface of the mounting member, the recesses including a first plurality of recesses disposed adjacent an outer periphery of the mounting member such that the first recesses follow an entire contour of the outer periphery of the mounting member, and a second plurality of recesses disposed adjacent the fastener mounting holes and radially inward of the first plurality of recesses with respect to the attachment aperture.

7. The vehicle body pass-through structure according to claim 1, wherein
the first open end portion of the grommet and the second open end portion of the grommet are not axially aligned.

8. The vehicle body pass-through structure according to claim 7, wherein
the mounting member has first alignment indicia and the grommet has second alignment indicia, such that the first and second alignment indicia are in an aligned orientation when the mounting member and the grommet are in an installed position, and the first and second alignment indicia are visible from an exterior of the mounting member and the grommet when in the installed position.

9. The vehicle body pass-through structure according to claim 8, wherein
the second open end portion extends transversely from a first side of the first open end portion so as to form an elbow,
the second indicia are located on a second side of the first open end portion which is opposite the first side of the first open end portion, and
the mounting member further has third indicia located so as to indicate orientation of the pass through structure with respect to a body panel of a vehicle having the vehicle body pass-through structure.

10. The vehicle body pass-through structure according to claim 1, wherein
the grommet further includes an annular body panel receiving groove disposed adjacent the first side of the seal member.

11. A vehicle body structure comprising:
an exterior vehicle body panel having an exterior body panel opening;
a vehicle body pass-through structure disposed in the exterior body panel opening of the exterior vehicle body panel, the vehicle body pass-through structure including
an elastically deformable seal member including a first side contacting an exterior side of the exterior vehicle body panel, a second side, an access opening extending through the seal member between the first side and the second side, a first annular sealing bead projecting outward from the first side along an outer peripheral edge of the first side;
a rigid mounting member overlying the second side of the seal member so that the access opening of the seal member aligns with an attachment aperture of the mounting member, the rigid mounting member having an outer edge which radially extends beyond the outer peripheral edge of the first side of the seal member with respect to the attachment aperture;
a grommet including a first open end portion, a second open end portion, and a passageway extending between the first open end portion and the second open end portion, the first open end portion being disposed in the attachment aperture of the mounting member; and
a plurality of fastener mounting holes extending through the seal member, the mounting member, and the exterior vehicle body panel, with fasteners extending entirely through the seal member, the mounting member and the exterior vehicle body panel via the fastener mounting holes.

12. The vehicle body structure according to claim 11, further comprising
an exterior vehicle accessory disposed on the exterior side of the exterior vehicle body panel; and
an interior vehicle part disposed on an interior side of the exterior vehicle body panel, with the interior vehicle part being electrically coupled to the exterior vehicle accessory via an electrical wire extending through the passageway of the grommet.

13. The vehicle body structure according to claim 11, wherein
the seal member further includes
a plurality of second annular sealing beads that projects outwardly from the first side of the seal member, with one of the second annular sealing beads being disposed around each of the fastener mounting holes.

14. The vehicle body structure according to claim 13, wherein
the mounting member further includes a lower surface with a plurality of recesses, the seal member being molded over the lower surface of the mounting member with portions of the seal member extending into the recesses of the lower surface of the mounting member,
the recesses including a first plurality of recesses disposed adjacent an outer periphery of the mounting member such that the first plurality of recesses follow an entire contour of the outer periphery of the mounting member, and a second plurality of recesses disposed adjacent the fastener mounting holes and radially inward of the first plurality of recesses with respect to the attachment aperture.

15. The vehicle body structure according to claim 11, wherein
the attachment aperture of the mounting member has a smaller diameter than the access opening of the seal member such that the mounting member has an end face that is recessed from the first side of the seal member thereby creating a recess; and
the grommet further includes a contact member disposed in the recess.

16. The vehicle body structure according to claim 15, wherein
the contact member is an annular flange with a lower face contacting the exterior side of the exterior vehicle body panel an upper face contacting the end face of the mounting member.

17. The vehicle body structure according to claim 11, wherein
the mounting member further includes a lower surface with a plurality of recesses with the seal member being molded over the lower surface of the mounting member with portions of the seal member extending into the recesses of the lower surface of the mounting member,
the recesses including a first plurality of recesses disposed along an outer periphery of the mounting member between an outer edge of the mounting member and the fastener mounting holes, and a second plurality of recesses disposed radially inward of the first plurality of recesses with respect to the attachment aperture and about a circumference of the fastener mounting holes.

18. The vehicle body structure according to claim 11, wherein
the first open end portion of the grommet and the second open end portion of the grommet are not axially aligned.

19. The vehicle body structure according to claim 18, wherein
the mounting member has first alignment indicia and the grommet has second alignment indicia, such that the first and second alignment indicia are in an aligned orientation when the mounting member and the grommet are in an installed position, and the first and second alignment indicia are visible from an exterior of the mounting member and the grommet when in the installed position.

20. The vehicle body structure according to claim 19, wherein
the second open end portion extends transversely from a first side of the first open end portion so as to form an elbow,
the second indicia are located on a second side of the first open end portion which is opposite the first side of the first open end portion, and
the mounting member further has third indicia located so as to indicate orientation of the pass through structure with respect to the exterior vehicle body panel.

21. The vehicle body structure according to claim 11, wherein
the grommet further includes an annular body panel receiving groove with the exterior vehicle body panel being disposed in the annular body panel receiving groove.

* * * * *